(12) United States Patent
Murphy et al.

(10) Patent No.: US 9,460,092 B2
(45) Date of Patent: Oct. 4, 2016

(54) MEDIA ASSET RECOMMENDATION SERVICE

(75) Inventors: Shawn M. Murphy, Seattle, WA (US); Christopher B. Weare, Bellevue, WA (US); Christopher A. Evans, Sammamish, WA (US); Chad C. Gibson, Seattle, WA (US)

(73) Assignee: ROVI TECHNOLOGIES CORPORATION, San Carlos, CA (US)

( * ) Notice: Subject to any disclaimer, the term of this patent is extended or adjusted under 35 U.S.C. 154(b) by 1301 days.

(21) Appl. No.: 12/485,155

(22) Filed: Jun. 16, 2009

(65) Prior Publication Data
US 2010/0318919 A1 Dec. 16, 2010

(51) Int. Cl.
| | | |
|---|---|---|
| G06F 17/30 | (2006.01) |
| H04N 21/482 | (2011.01) |
| G06Q 30/06 | (2012.01) |
| G06Q 50/00 | (2012.01) |

(52) U.S. Cl.
CPC ... G06F 17/30038 (2013.01); G06F 17/30828 (2013.01); G06Q 30/0631 (2013.01); H04N 21/4826 (2013.01); G06F 17/30029 (2013.01); G06F 17/30772 (2013.01); G06Q 50/01 (2013.01)

(58) Field of Classification Search
CPC ...... G06Q 30/0631; G06Q 30/0254–30/0256; G06Q 30/0269; G06Q 50/01; G06F 17/30761; G06F 17/30766; G06F 17/30769–17/30772; G06F 17/30029; G06F 17/30035; G06F 17/30828; G06F 17/30038; H04N 21/4826
USPC ......................................................... 715/745
See application file for complete search history.

(56) References Cited

U.S. PATENT DOCUMENTS

| | | | |
|---|---|---|---|
| 6,438,579 B1 * | 8/2002 | Hosken | 709/203 |
| 6,925,469 B2 * | 8/2005 | Headings et al. | 705/1.1 |
| 7,884,274 B1 * | 2/2011 | Wieder | 84/609 |

(Continued)

FOREIGN PATENT DOCUMENTS

| | | |
|---|---|---|
| CN | 1720740 | 1/2006 |
| CN | 101286217 | 10/2008 |

(Continued)

OTHER PUBLICATIONS

KuanTing Liu, Roger Andersson Reimer, Social playlist: enabling touch points and enriching ongoing relationships through collaborative mobile music listening, Proceedings of the 10th international conference on Human computer interaction with mobile devices and services, Sep. 2-5, 2008, Amsterdam, The Netherlands.*

(Continued)

*Primary Examiner* — Eric Wiener
(74) *Attorney, Agent, or Firm* — Ropes Gray LLP

(57) ABSTRACT

A media asset recommendation service is described. In embodiments, friends of a user are identified in a social graph that is associated with the user, and interactions with media assets by the friends of the user are compiled. Friend interaction data for each of the media assets can be determined from the media assets, the social graph, and the interactions with the media assets by the friends of the user. When a selection of one of the media assets is received from the user via a user device, the friend interaction data that is associated with the media asset selected by the user is communicated to the user device.

14 Claims, 5 Drawing Sheets

(56) References Cited

U.S. PATENT DOCUMENTS

| | | | |
|---|---|---|---|
| 7,984,056 B1* | 7/2011 | Kane | 707/749 |
| 8,489,515 B2* | 7/2013 | Mathur | 705/319 |
| 8,732,175 B2* | 5/2014 | Butterfield et al. | 707/748 |
| 2001/0013009 A1* | 8/2001 | Greening et al. | 705/10 |
| 2001/0021914 A1* | 9/2001 | Jacobi et al. | 705/8 |
| 2002/0082901 A1* | 6/2002 | Dunning et al. | 705/10 |
| 2003/0229537 A1* | 12/2003 | Dunning et al. | 705/10 |
| 2004/0107821 A1* | 6/2004 | Alcalde et al. | 84/608 |
| 2006/0048059 A1 | 3/2006 | Etkin | |
| 2006/0143236 A1* | 6/2006 | Wu | 707/104.1 |
| 2006/0173910 A1* | 8/2006 | McLaughlin | 707/104.1 |
| 2006/0195462 A1* | 8/2006 | Rogers | 707/100 |
| 2006/0195480 A1* | 8/2006 | Spiegelman et al. | 707/104.1 |
| 2006/0195512 A1* | 8/2006 | Rogers et al. | 709/203 |
| 2006/0195513 A1* | 8/2006 | Rogers et al. | 709/203 |
| 2006/0195514 A1* | 8/2006 | Rogers et al. | 709/203 |
| 2006/0195515 A1* | 8/2006 | Beaupre et al. | 709/203 |
| 2006/0195516 A1* | 8/2006 | Beaupre | 709/203 |
| 2006/0195789 A1* | 8/2006 | Rogers et al. | 715/727 |
| 2006/0195790 A1 | 8/2006 | Beaupre et al. | |
| 2006/0282856 A1* | 12/2006 | Errico et al. | 725/46 |
| 2007/0112687 A1* | 5/2007 | Read | 705/64 |
| 2007/0233736 A1* | 10/2007 | Xiong et al. | 707/104.1 |
| 2007/0281607 A1 | 12/2007 | Bucher et al. | |
| 2007/0288964 A1* | 12/2007 | Horiguchi | 725/46 |
| 2008/0016205 A1* | 1/2008 | Svendsen | 709/224 |
| 2008/0052371 A1 | 2/2008 | Partovi et al. | |
| 2008/0066102 A1* | 3/2008 | Abraham et al. | 725/37 |
| 2008/0091717 A1* | 4/2008 | Garbow et al. | 707/104.1 |
| 2008/0134053 A1* | 6/2008 | Fischer | 715/747 |
| 2008/0154959 A1* | 6/2008 | Dunko | 707/104.1 |
| 2008/0168055 A1* | 7/2008 | Rinearson et al. | 707/7 |
| 2008/0215568 A1* | 9/2008 | Yang et al. | 707/5 |
| 2008/0243733 A1* | 10/2008 | Black | 706/16 |
| 2008/0250312 A1 | 10/2008 | Curtis | |
| 2008/0256017 A1* | 10/2008 | Murakami | 706/52 |
| 2008/0294607 A1* | 11/2008 | Partovi et al. | 707/3 |
| 2008/0319833 A1* | 12/2008 | Svendsen | 705/10 |
| 2009/0055377 A1* | 2/2009 | Hedge et al. | 707/5 |
| 2009/0055396 A1* | 2/2009 | Svendsen et al. | 707/7 |
| 2009/0055759 A1* | 2/2009 | Svendsen | 715/764 |
| 2009/0077220 A1* | 3/2009 | Svendsen et al. | 709/224 |
| 2009/0083117 A1* | 3/2009 | Svendsen et al. | 705/10 |
| 2009/0083260 A1 | 3/2009 | Artom et al. | |
| 2009/0083362 A1* | 3/2009 | Svendsen | 709/201 |
| 2009/0119294 A1* | 5/2009 | Purdy et al. | 707/7 |
| 2009/0132527 A1* | 5/2009 | Sheshagiri et al. | 707/5 |
| 2009/0157795 A1* | 6/2009 | Black | 709/202 |
| 2009/0197681 A1* | 8/2009 | Krishnamoorthy et al. | 463/42 |
| 2009/0228918 A1* | 9/2009 | Rolff et al. | 725/34 |
| 2009/0234784 A1* | 9/2009 | Buriano et al. | 706/12 |
| 2010/0017361 A1* | 1/2010 | Pan | 707/1 |
| 2010/0153175 A1* | 6/2010 | Pearson et al. | 705/10 |
| 2010/0251141 A1* | 9/2010 | Sabin et al. | 715/758 |
| 2010/0280860 A1* | 11/2010 | Iskold et al. | 705/7 |

FOREIGN PATENT DOCUMENTS

| | | |
|---|---|---|
| KR | 20060119341 | 11/2006 |
| KR | 1020060119341 A | 11/2006 |
| KR | 20090025441 | 3/2009 |
| KR | 1020090025441 A | 3/2009 |
| KR | 20120031478 | 4/2012 |
| WO | WO 2004052010 A1 * | 6/2004 |

OTHER PUBLICATIONS

Sarwar, B., Karypsis, G., Konstan, J., and Riedl, J., Item-based Collaborative Filtering Recommendation Algorithms, In Proc. of the 10th International World Wide Web Conference (WWW10) 2001, Hong Kong.*

Machine translation of: KR 10-2006-0119341; filed by Jeong, Gyu-Yong; published Nov. 24, 2006; retrieved from Korean Intellectual Property Office.*

"iLike/ Take the Tour", retrieved at <<http://www.ilike.com/tour>>, May 8, 2009, p. 1.

"The Filter", retrieved at <<http://www.thefilter.com/Help/>>, May 8, 2009, pp. 2.

"What is MyStrands?", retrieved at <<http://www.mystrands.com/download>>, May 8, 2009, pp. 3.

"Sunoh.fm Launches Platform for Social Discovery of Indian Music", retrieved at <<http://www.startupdunia.com/india-startups/sunohfm-launches-platform-for-social-discovery-of-indian-music-1066>>, May 8, 2009, pp. 6.

"CUtunes Project Report", retrieved at <<http://www.metablake.com/cutunes-update/index.html, May 8, 2009, pp. 15.

"Zune 3.0 Software", retrieved at <<http://www.zunerama.com/zune-30-your-guide-to-whats-new/zune-30-software/>>, May 8, 2009, pp. 4.

"International Search Report", Mailed Date: Jan. 6, 2011, Application No. PCT/US2010/038764, Filed Date: Jun. 16, 2010, pp. 9.

"Foreign Office Action", Chinese Application No. 201080027479.8, (Aug. 20, 2013), 13 Pages.

"Foreign Office Action", CN Application No. 201080027479.8, Mar. 5, 2014, 15 Pages.

"Foreign Office Action", Chinese Application No. 201080027479.8, (Jan. 14, 2013), 11 pages.

* cited by examiner

MEDIA ASSET RECOMMENDATION SERVICE

BACKGROUND

A recommendation from a friend to listen to a song, or to see a movie, can be an effective way for a person to discover new songs and movies. However, a person is not likely to receive recommendations from friends on a continuous basis. For instance, people may miss out listening to songs that their friends already listen to and enjoy simply because they do not discuss music with their friends on a consistent basis. Similarly, a person may want to watch a particular movie, but would like to know whether any friends have already watched and enjoyed the movie. Knowledge that a friend has watched and enjoyed the movie may assist the person in reaching a decision to watch the movie. Alternately, information that a friend has watched but disliked the movie may dissuade the person from watching the movie.

SUMMARY

This summary is provided to introduce simplified concepts of a media asset recommendation service. The simplified concepts are further described below in the Detailed Description. This summary is not intended to identify essential features of the claimed subject matter, nor is it intended for use in determining the scope of the claimed subject matter.

A media asset recommendation service is described. In embodiments, friends of a user are identified in a social graph that is associated with the user, and interactions with media assets by the friends of the user are compiled. Friend interaction data for each of the media assets can be determined from the media assets, the social graph, and the interactions with the media assets by the friends of the user. When a selection of one of the media assets is received from the user via a user device, the friend interaction data that is associated with the media asset selected by the user is communicated to the user device. In various embodiments, the media asset is a digital music file of a song and the interactions with the media asset include any one of purchasing the digital music file, downloading the digital music file, rendering the song, or discussing the song by the friends of the user.

In other embodiments, the friend interaction data includes a list of friends of the user that have interacted with the media asset. The list of friends of the user can be sorted in a descending order based on an interaction rating corresponding to each friend. The interaction rating can be determined from the interactions with the media asset by each friend of the user in the list. The friend interaction data can also include the interactions with the media asset by each of the friends.

In other embodiments, a higher weight is assigned to interactions by friends of the user that have a higher user similarity rating when the list of friends is generated. The user similarity rating is determined from a similarity between the interactions with the media assets by the friends of the user and interactions with the media assets by the user. A prediction rating that indicates a likelihood that the user will like the media asset, based at least in part on the interactions with the media asset by the friends of the user and the user similarity ratings of the friends of the user, can also be included in the friend interaction data.

BRIEF DESCRIPTION OF THE DRAWINGS

Embodiments of a media asset recommendation service are described with reference to the following drawings. The same numbers are used throughout the drawings to reference like features and components.

DETAILED DESCRIPTION

Embodiments of a media asset recommendation service provide a user with a list of friends that have interacted with a particular media asset, such as a song or a movie. A service layer receives social graph data and interaction data that correlates to interactions with media assets by both the user and the friends of the user. A media asset recommendation service can then generate friend interaction data that includes a list of friends of the user that have interacted with a particular media asset by aggregating the media assets, the social graph data, and the interaction data. For example, a list of friends of a user that have interacted with a particular song can be generated based on interaction data that indicates that the friends of the user have played or downloaded the song. The user can then use their own personal understanding of the tastes in music of their friends to aid in a decision of whether to play or download the song.

In addition, friend interaction data can include a compilation of the interactions with the media asset by each friend in the list and a user similarity rating for each friend in the list. For example, the friend interaction data can indicate that a friend of the user has played a particular song hundreds of times on a portable media device. The user similarity rating can be determined from the similarity between the interactions with media assets by the friends of the user and interactions with media assets by the user. In an implementation, the media asset recommendation service can also generate a prediction rating that indicates a likelihood the user will like the media asset based at least in part on the interactions with the media asset by the friends of the user and the user similarity ratings of the friends of the user.

While features and concepts of the described systems and methods for a media asset recommendation service can be implemented in any number of different environments, systems, and/or various configurations, embodiments of a media asset recommendation service are described in the context of the following example systems and environments.

Figure 1:
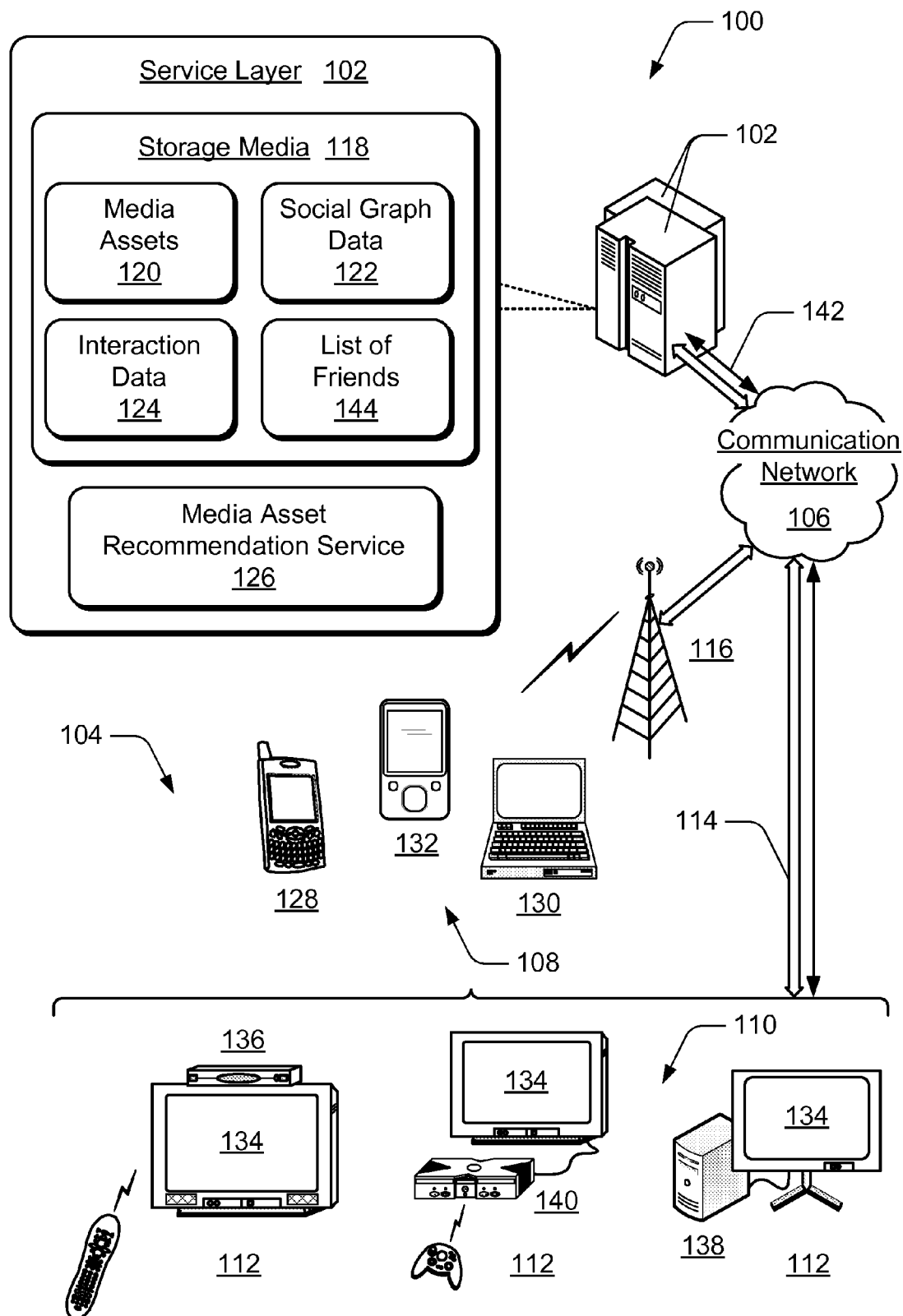
FIG. 1 illustrates an example system in which embodiments of a media asset recommendation service can be implemented.

FIG. 1 illustrates an example system 100 in which various embodiments of a media asset recommendation service can be implemented. In this example, system 100 includes a service layer 102 that can be configured to communicate or otherwise provide media assets and data to any number of various devices 104 via a communication network 106. The various devices 104 can include wireless devices 108 as well as other client devices 110 (e.g., wired and/or wireless devices) that are implemented as components in various client systems 112 in a media asset distribution system.

The communication network 106 can be implemented to include a broadcast network, an IP-based network 114, and/or a wireless network 116 that facilitates media asset distribution and data communication between the service layer 102 and any number of the various devices. The communication network 106 can also be implemented as part of a media asset distribution system using any type of network topology and/or communication protocol, and can be represented or otherwise implemented as a combination of two or more networks.

In the example system 100, service layer 102 includes storage media 118 to store or otherwise maintain various data and media assets, such as media assets 120, social graph data 122, and interaction data 124 that is a compilation of interactions with the media assets 120 by a user and friends of the user that are identified in a social graph. The storage media 118 can be implemented as any type of memory, random access memory (RAM), a nonvolatile memory such as flash memory, read only memory (ROM), and/or other suitable electronic data storage. Service layer 102 can also include one or more media content servers that are implemented to communicate, or otherwise distribute, the media assets 120 and/or other data to any number of the various user devices.

The media assets 120 can include any type of audio, video, and/or image data received from any type of media content or data source. As described throughout, media assets can include music, television programming, movies, on-demand media content, interactive games, network-based applications, and any other audio, video, and/or image data (e.g., to include program guide application data, user interface data, advertising content, closed captions data, content metadata, search results and/or recommendations, etc.).

Service layer 102 also includes a media asset recommendation service 126 that can be implemented as computer-executable instructions and executed by processors to implement the various embodiments and/or features described herein. In addition, service layer 102 can be implemented with any number and combination of differing components as further described with reference to the example device shown in FIG. 5. The media asset recommendation service 126, as well as other functionality described to implement embodiments of a media asset recommendation service, can also be provided as a service apart from the service layer 102 (e.g., on a separate server or by a third party service).

The wireless devices 108 can include any type of device implemented to receive and/or communicate wireless data, such as any one or combination of a mobile phone 128 (e.g., cellular, VoIP, WiFi, etc.), a portable computer device 130, a media device 132 (e.g., a personal media player, portable media player, etc.), and/or any other wireless device that can receive media assets in any form of audio, video, and/or image data. Each of the client systems 112 include a respective client device and display device 134 that together render or playback any form of audio, video, and/or image media content.

A display device 134 can be implemented as any type of a television, high definition television (HDTV), LCD, or similar display system. A client device in a client system 112 can be implemented as any one or combination of a television client device 136 (e.g., a television set-top box, a digital video recorder (DVR), etc.), a computer device 138, a gaming system 140, an appliance device, an electronic device, and/or as any other type of client device that may be implemented to receive media assets in any form of audio, video, and/or image data in a media asset distribution system.

Any of the various devices can be implemented with one or more processors, communication components, memory components, signal processing and control circuits, and a media asset rendering system. Further, any of the wireless devices 108 and/or other client devices 110 can be implemented with any number and combination of differing components as further described with reference to the example device shown in FIG. 5. A user device may also be associated with a user (i.e., a person) and/or an entity that operates the device such that a user device describes logical devices that include users, software, and/or a combination of devices.

Any of the wireless devices 108 and/or other client devices 110 can communicate with service layer 102 via a two-way data communication link 142 of the communication network 106. It is contemplated that any one or more of the arrowed communication link 142, IP-based network 114, and wireless network 116, along with communication network 106, facilitate two-way data communication, such as from a user device to the service layer 102 and vice-versa.

The service layer 102 can store the social graph data 122 and the interaction data 124 when received from any of the user devices 104 via communication network 106. Social graph data 122 includes a list of friends of a user that are associated by social interactions, communications, and relational parameters that form a social graph. The social graph data 122 can include a list of persons known to the user, such as friends of the user, and the relationships between the user and the friends of the user. It is to be appreciated that friends of the user can include family members, coworkers, or any person that the user knows and is associated with in a social graph.

The interaction data 124 correlates to interactions with the media assets 120 by both the user and the friends of the user that are identified in the social graph and associated with the user. In various implementations, the interaction data can include, but is not limited to, catalog data, usage data, ratings data, and/or discussion data.

Catalog data includes a listing of media assets that are downloaded, purchased, stored, and/or owned by a user or friends of the user. For example, a friend of a user may own a variety of different songs and videos that are stored on portable media device 132. In this example, a listing of the songs and videos stored on the portable media device can be communicated to the service layer 102 as catalog data. Further, when a new song or video is added to the portable media device, the catalog data associated with the new song or video can be received by service layer 102 to update the catalog data that is associated with the friend of the user.

Usage data indicates the number of times and/or frequency that a user or friends of the user have rendered or played media assets that are identified by the catalog data. For example the usage data can indicate that a particular song has been played hundreds of times on portable media device 132, or that movies starring a particular actor are frequently displayed for viewing at the portable media device. When a friend of a user plays or renders a media asset, usage data can be received by the service layer 102 from the portable media device 132 via communication network 106.

Ratings data includes ratings that have been assigned to media assets by a user or friends of the user. For example, a friend of the user can assign ratings to songs or movies on portable media device 132 to indicate how much the friend likes a particular song or movie. When the friend assigns a rating to a media asset, ratings data can be received by the service layer 102 from the portable media device.

Discussion data includes discussions related to media assets by a user or friends of the user. Discussion data can be received from a variety of different sources, such as blogs and message boards. For example, a friend of the user can discuss a particular song on a message board associated with the song. When the friend discusses a media asset, the discussion data can be received by the service layer 102 via communication network 106.

In various embodiments, the media asset recommendation service 126 at service layer 102 is implemented to generate a list of friends 144 for each media asset 120 by aggregating the media assets 120, the social graph data 122, and the interaction data 124. The list of friends 144 of the user include friends that are associated with the user by the social graph and that have interacted with the media assets. For instance, the list of friends of the user can include friends that have interacted with a particular media asset by downloading, purchasing, storing, owning, rendering, playing, rating, or discussing the media asset.

In various embodiments, the friend interaction data 124 includes indications of the interactions with the media asset by each friend of the user in the list of friends 144. For example, the friend interaction data 124 can indicate that a friend of the user has interacted with a particular song by playing the song hundreds of times on a portable media device. The friend interaction data, therefore, can provide a user with information that indicates which friends have interacted with a particular media asset and how they have interacted with the media asset. The user can use this information, as well as a personal understanding of the tastes in media assets of their friends, to aid in their decision of whether to interact with the media asset, such as by rendering or purchasing the media asset. For example, if a user has a friend that has great taste in music, the user may be more inclined to purchase a song that this friend has also purchased based on a personal understanding of the friend's taste in music.

The friends of the user that are listed in the list of friends 144 can be sorted in a descending order based on an interaction rating corresponding to each friend. The interaction rating is determined from the interactions with the media asset by each friend in the list. For example, a first friend who has listened to a particular song hundreds of times may have a higher interaction rating for the song than a second friend who has only listened to the song several times. In this example, the first friend may be listed ahead of the second friend in the list of friends. Listing the friends in descending order based on an interaction rating enables the user to quickly and easily determine which friends have interacted with a media asset the most.

The media asset recommendation service 126 is also implemented to generate the list of friends by assigning a higher weight to interactions by friends that have a higher user similarity rating. The user similarity rating is determined from the similarity between the interactions with media assets by the friends of the user and interactions with the media assets by the user. For example, users that have similar catalog, usage, ratings, and/or discussion data can have a high user similarity rating (e.g., closer to 100%) whereas users whose catalog, usage, ratings, and/or discussion data has very little similarity have a low similarity rating (e.g., closer to 0%). For example, a friend of a user may have a high user similarity rating if the friend has listened or downloaded many of the same songs that the user has also listened to and/or downloaded.

A user similarity rating can provide a user with information that indicates which friends have the most similar tastes in media assets to the user. The user can use this information to aid in their decision of whether to interact with a media asset, such as by rendering or purchasing the media asset. For example, if a user has a friend that has a high user similarity rating for music, the user may be more inclined to purchase a song that this friend has also purchased because the user knows that the friend likes similar music.

In embodiments, the friend interaction data 124 further includes a prediction rating that indicates a likelihood that the user will like the media asset based at least in part on the interactions with the media asset by the friends of the user and the user similarity ratings of the friends of the user. For example, if many of the friends of the user that have high user similarity ratings have interacted with a particular song, the media asset recommendation service 126 can generate a high prediction rating for the song.

The media asset recommendation service 126 can receive a selection of one of the media assets 120 from a user via a user device 104. The media asset recommendation service can then initiate communication of the friend interaction data 124 from service layer 102 to the user device 104 via communication network 106. The friend interaction data 124 can include the list of friends 144 of the user that have interacted with a particular media asset and indications of the interactions with the media asset by each friend in the list. In addition, the friend interaction data 124 can include a prediction rating that indicates a likelihood that the user will like the media asset.

Although illustrated and described as a component or module of the service layer 102, the media asset recommendation service 126 can be implemented as an independent service to implement embodiments of a media asset recommendation service. Further, although the media asset recommendation service is illustrated and described as a single component or module, the media asset recommendation service 126 can be implemented as several component applications or modules distributed to implement various embodiments of a media asset recommendation service as described herein.

Figure 2:
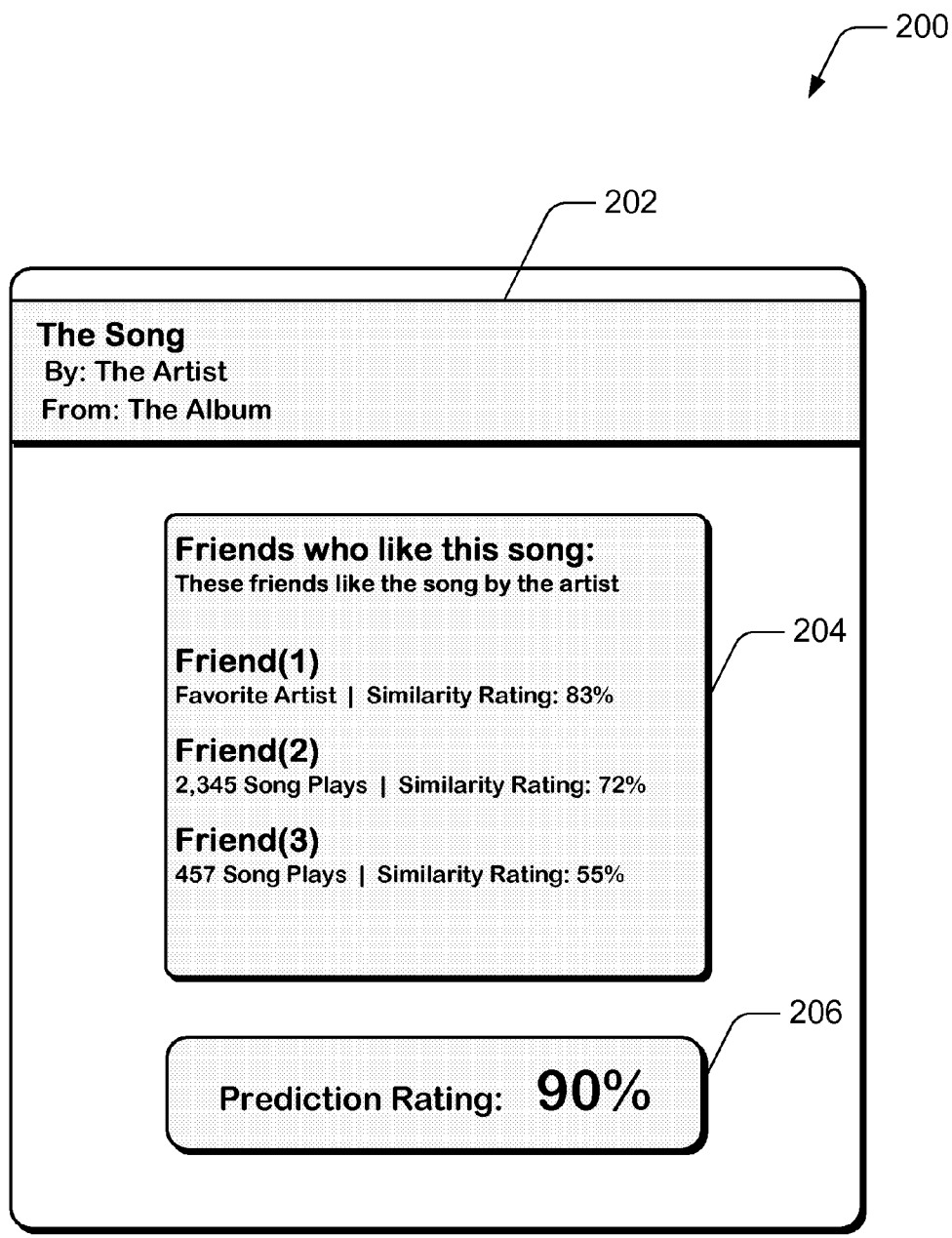
FIG. 2 illustrates an example asset recommendation interface that includes a list of friends displayed at a user device.

FIG. 2 illustrates an example asset recommendation interface 200 that includes the friend interaction data as compiled by the media asset recommendation service 126 shown in FIG. 1, and received by a user device 104 for display. Asset recommendation interface 200 includes a media asset information display 202 that includes information about a particular media asset, such as the name of a song, the artist, and other associated information. The asset recommendation interface 200 also includes a list of friends 204 and a prediction rating 206. Although not shown, the asset recommendation interface 200 can also include various user-selectable controls to interact with the media asset, such as to play, render, download, purchase, rate, or discuss the media asset. It is to be appreciated, therefore, that the list of friends 204 and the prediction rating 206 can be integrated into a variety of different user interfaces, such as a media player user interface.

The list of friends 204 includes friends of the user that have interacted with the particular media asset, and includes indications of the interactions with the media asset by each friend in the list. As described above, a list of friends can be generated by the media asset recommendation service 126 and, in this example, three different friends of the user are determined to have interacted with the song (e.g., the particular media asset). For example, the song is by the favorite artist of Friend(1), and Friend(2) and Friend(3) have interacted with the song by playing the song many times.

In an implementation, the friends that are included in the list of friends can be listed in a descending order based on an interaction rating corresponding to each friend. The media asset recommendation service 126 can determine the interaction rating from the interactions with the media asset by each friend in the list. In this example, Friend(1) is listed first because the artist is a favorite artist. Similarly, Friend(2) is listed before Friend(3) because Friend(2) has played the song more times.

The list of friends 204 also includes a user similarity rating for each friend in the list. As described above, a user similarity rating can be generated by the media asset recommendation service 126 based on the similarity between the interactions with media assets by the friends of the user and interactions with the media assets by the user. In this example, the media asset recommendation service has determined that Friend(1) has a user similarity rating of 83%. The user may be more inclined to listen to or download the song that Friend(1) has purchased because the user knows that Friend(1) likes similar music. Similarly, Friend(2) and Friend(3) have respective user similarity ratings of 72% and 55%.

The prediction rating 206 indicates a likelihood that the user will like the media asset based at least in part on the interactions with the media asset by the friends of the user and the user similarity ratings of the friends. In this example, the media asset recommendation service 126 has determined that the there is a 90% likelihood that the user will like the song. The user may be more inclined to listen or download this song based on the high prediction rating that the user will like the song.

Example methods 300 and 400 are described with reference to respective FIGS. 3 and 4 in accordance with one or more embodiments of a media asset recommendation service. Generally, any of the functions, methods, procedures, components, and modules described herein can be implemented using hardware, software, firmware, fixed logic circuitry, manual processing, or any combination thereof. A software implementation of a function, method, procedure, component, or module represents program code that performs specified tasks when executed on a computing-based processor. The example methods may be described in the general context of computer-executable instructions, which can include software, applications, routines, programs, objects, components, data structures, procedures, modules, functions, and the like.

The methods may also be practiced in a distributed computing environment where functions are performed by remote processing devices that are linked through a communication network. In a distributed computing environment, computer-executable instructions may be located in both local and remote computer storage media, including memory storage devices. Further, the features described herein are platform-independent such that the techniques may be implemented on a variety of computing platforms having a variety of processors.

Figure 3:
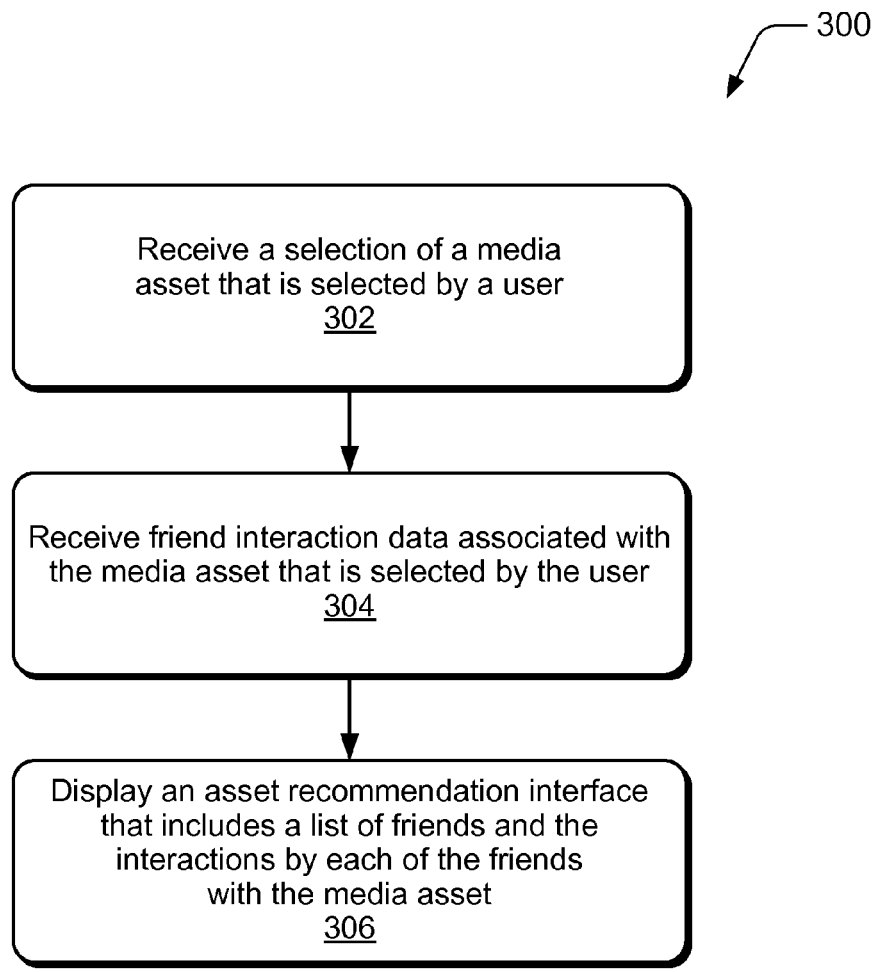
FIG. 3 illustrates example method(s) for a media asset recommendation service in accordance with one or more embodiments.

FIG. 3 illustrates example method(s) 300 of a media asset recommendation service. The order in which the method is described is not intended to be construed as a limitation, and any number of the described method blocks can be combined in any order to implement the method, or an alternate method.

At block 302, a selection of a media asset that is selected by a user is received. For example, a user device 104 (FIG. 1) receives a selection of a media asset 120 that is selected by a user. The media asset can include a digital music file of a song, a digital video file of a video, or any other type of media asset as described throughout. At block 304, friend interaction data associated with the media asset that is selected by the user is received. For example, the user device 104 receives friend interaction data 124 from the service layer 102 when generated by the media asset recommendation service 126. The friend interaction data 124 includes a list of friends 144 of the user that have interacted with the media asset, and includes indications of interactions with the media asset by each of the friends.

At block 306, an asset recommendation interface is displayed that includes the list of friends and the interactions by each of the friends with the media asset. For example, user device 104 displays an asset recommendation interface 200 (FIG. 2) that includes a list of friends 204. In various embodiments, the friend interaction data can include the list of friends of the user that have interacted with a particular media asset and indications of the interactions with the media asset by each friend in the list. The friend interaction data can also include a user similarity rating for each friend in the list. The asset recommendation interface 200 that is associated with the media asset also includes a prediction rating 206 that indicates a likelihood that the user will like the media asset.

Figure 4:
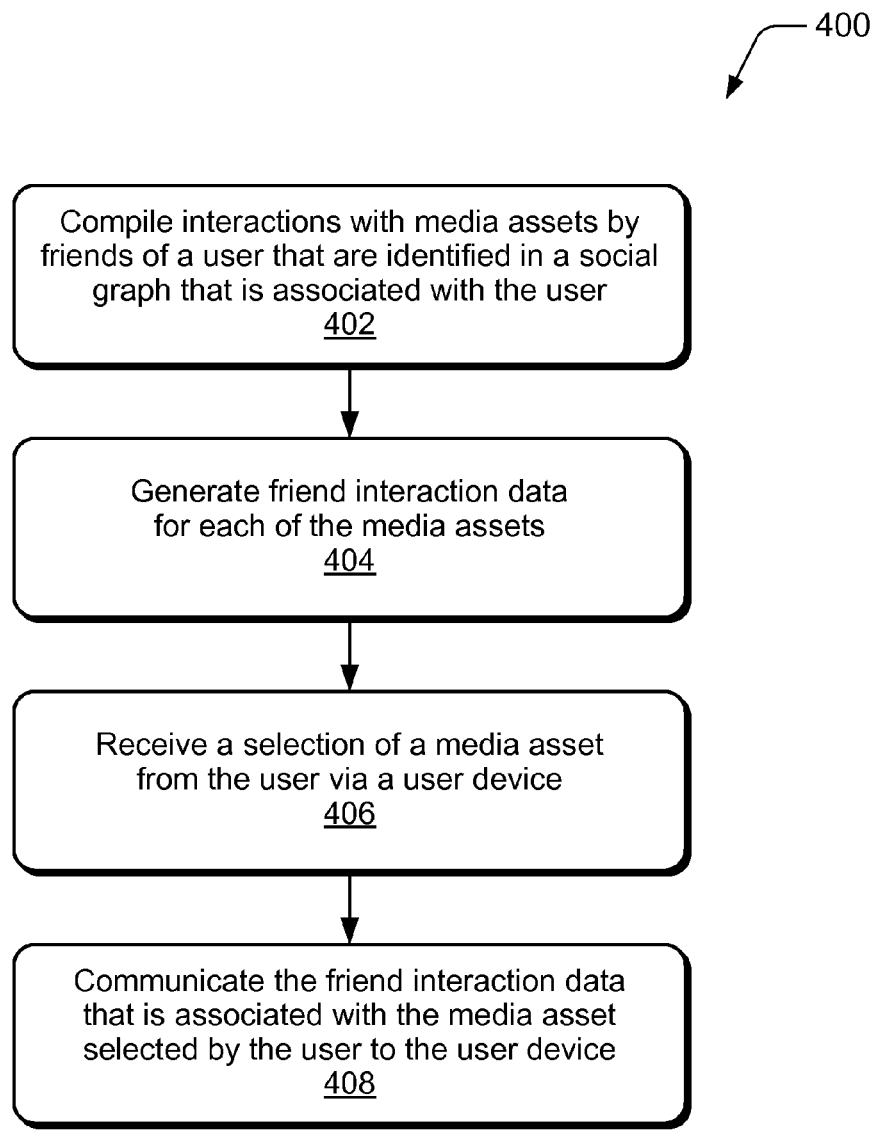
FIG. 4 illustrates example method(s) for a media asset recommendation service in accordance with one or more embodiments.

FIG. 4 illustrates example method(s) 400 of a media asset recommendation service. The order in which the method is described is not intended to be construed as a limitation, and any number of the described method blocks can be combined in any order to implement the method, or an alternate method.

At block 402, interactions with media assets by friends of a user are compiled where the friends of the user are identified in a social graph that is associated with the user. For example, the service layer 102 (FIG. 1) receives interaction data 124 from user device(s) 104 that are associated with friends of a user. The media asset recommendation service 126 at service layer 102 compiles the interaction data 124 that correlates to interactions with media assets, such as by purchasing, downloading, rendering, playing, discussing, or rating media assets. The interaction data 124 can include catalog data, usage data, ratings data, and/or discussion data. The friends of the user are identified in a social graph that is associated with the user.

At block 404, friend interaction data for each of the media assets is generated. For example, the media asset recommendation service 126 at the service layer 102 generates the friend interaction data 124 by aggregating the media assets 120, the social graph data 122, and the interaction data 124. The friend interaction data is generated by the media asset recommendation service 126 to include a list of friends of the user that have interacted with each media asset. In various embodiments, the friend interaction data also includes indications of the interactions with the media asset by each friend in the list as well as a user similarity rating for each friend in the list. In implementations, the media asset recommendation service 126 generates the friend interaction data by assigning a higher weight to interactions by friends that have a higher user similarity rating.

At block 406, a selection of a media asset is received from the user via a user device. For example, a user device 104 communicates a selection of a media asset 120 to the service layer 102. The selection can include a selection to purchase, download, render, or play a variety of different media assets, such as a digital music file of a song, a digital video file of a video, or any other type of media asset as described throughout. At block 408, the friend interaction data that is associated with the media asset selected by the user is communicated to the user device. For example, the service layer 102 communicates the friend interaction data 124 to the user device 104.

Figure 5:
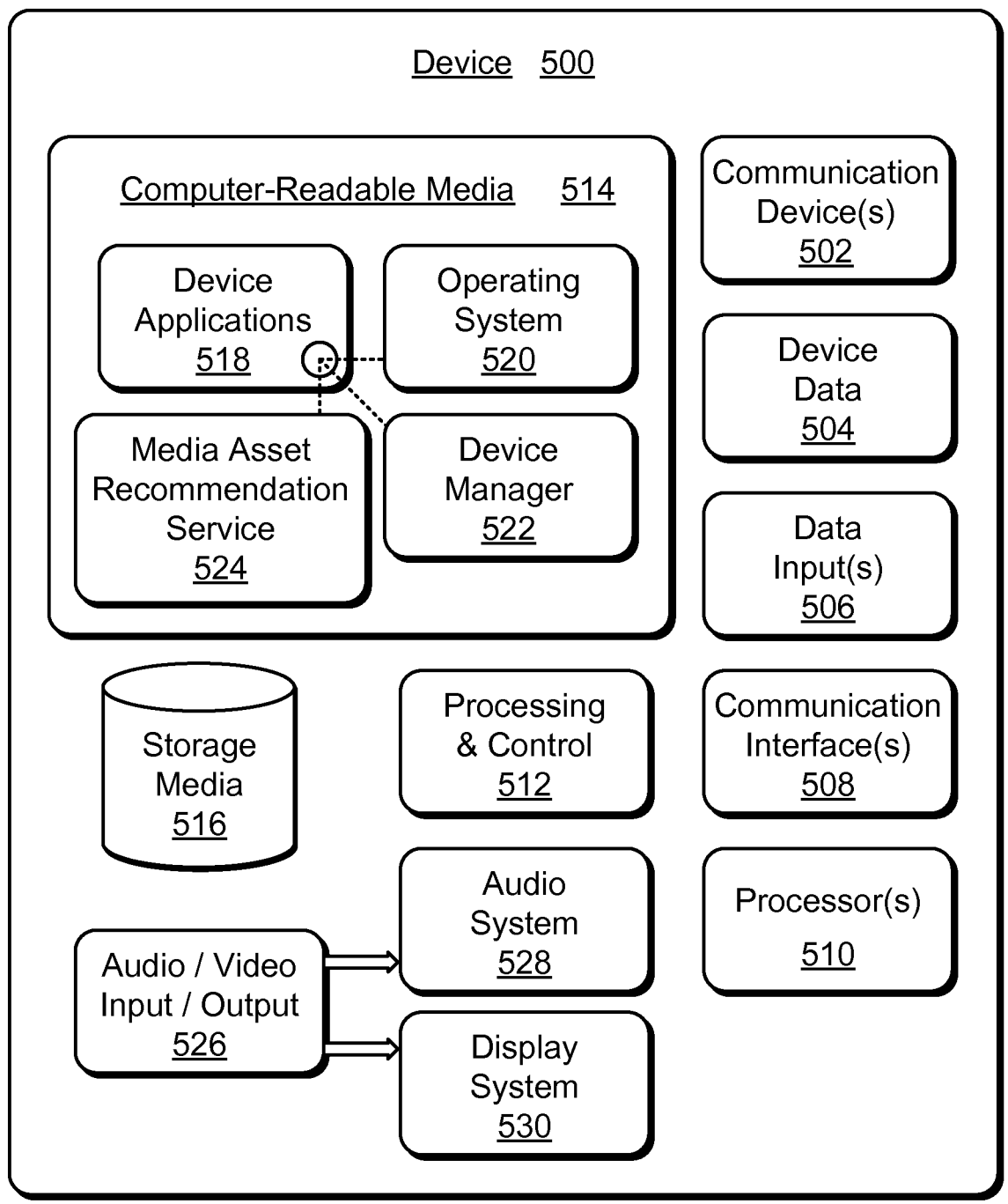
FIG. 5 illustrates various components of an example device that can implement embodiments of a media asset recommendation service.

FIG. 5 illustrates various components of an example device 500 that can be implemented as any type of client device and/or service layer as described with reference to FIG. 1 to implement embodiments of a media asset recommendation service. In embodiments, device 500 can be implemented as any one or combination of a wired and/or wireless device, as any form of television client device (e.g., television set-top box, digital video recorder (DVR), etc.), consumer device, computer device, portable computer device, user device, communication device, video processing and/or rendering device, appliance device, gaming device, electronic device, and/or as any other type of device. Device 500 may also be associated with a user (i.e., a person) and/or an entity that operates the device such that a device describes logical devices that include users, software, firmware, and/or a combination of devices.

Device 500 includes communication devices 502 that enable wired and/or wireless communication of device data 504 (e.g., received data, data that is being received, data scheduled for broadcast, data packets of the data, etc.). The device data 504 or other device content can include configuration settings of the device, media content stored on the device, and/or information associated with a user of the device. Media content stored on device 500 can include any type of audio, video, and/or image data. Device 500 includes one or more data inputs 506 via which any type of data, media content, and/or inputs can be received, such as user-selectable inputs, messages, music, television media content, recorded video content, and any other type of audio, video, and/or image data received from any content source and/or data source.

Device 500 also includes communication interfaces 508 that can be implemented as any one or more of a serial and/or parallel interface, a wireless interface, any type of network interface, a modem, and as any other type of communication interface. The communication interfaces 508 provide a connection and/or communication links between device 500 and a communication network by which other electronic, computing, and communication devices can communicate data with device 500.

Device 500 can include one or more processors 510 (e.g., any of microprocessors, controllers, and the like) which process various computer-executable instructions to control the operation of device 500 and to implement embodiments of a media asset recommendation service. Alternatively or in addition, device 500 can be implemented with any one or combination of hardware, firmware, or fixed logic circuitry that is implemented in connection with processing and control circuits which are generally identified at 512. Although not shown, device 500 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 500 can also include computer-readable media 514, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 500 can also include a mass storage media device 516.

Computer-readable media 514 provides data storage mechanisms to store the device data 504, as well as various device applications 518 and any other types of information and/or data related to operational aspects of device 500. For example, an operating system 520 can be maintained as a computer application with the computer-readable media 514 and executed on processors 510. The device applications 518 can include a device manager 522 (e.g., a control application, software application, signal processing and control module, code that is native to a particular device, a hardware abstraction layer for a particular device, etc.). The device applications 518 can also include any system components or modules of a media asset recommendation service 524 to implement the various embodiments described herein. In this example, the device applications 518 are shown as software modules and/or computer applications. Alternatively or in addition, the media asset recommendation service 524 can be implemented as hardware, software, firmware, or any combination thereof.

Device 500 can also include an audio and/or video input-output system 526 that provides audio data to an audio system 528 and/or provides video data to a display system 530. The audio system 528 and/or the display system 530 can include any devices that process, display, and/or otherwise render audio, video, and image data. Video signals and audio signals can be communicated from device 500 to an audio device and/or to a display device via an RF (radio frequency) link, S-video link, composite video link, component video link, DVI (digital video interface), analog audio connection, or other similar communication link. In an embodiment, audio system 528 and/or the display system 530 can be implemented as external components to device 500. Alternatively, the audio system 528 and/or the display system 530 can be implemented as integrated components of example device 500.

Although embodiments of a media asset recommendation service have been described in language specific to features and/or methods, it is to be understood that the subject of the appended claims is not necessarily limited to the specific features or methods described. Rather, the specific features and methods are disclosed as example implementations of a media asset recommendation service.

The invention claimed is:
1. A computer-implemented method initiated at a user device, the method comprising:
receiving a selection of a media asset that is selected by a user;
receiving friend interaction data associated with the media asset that is selected by the user, the friend interaction data including a list of friends of the user that have interacted with the media asset and interactions with the media asset by each of the friends; and
causing an asset recommendation interface to be displayed on a display of the user device, the asset recommendation interface including a simultaneous display of:
the list of friends and the interactions by each of the friends with the media asset, the friends of the user in the list displayed in the asset recommendation interface in a descending order based on an interaction rating corresponding to each friend, the interaction rating determined from the interactions with the media asset by each friend of the user in the list;

a user similarity rating for each of the friends of the user in the list, the user similarity rating indicating a similarity in media asset interactions between the user and each of the friends of the user; and a prediction rating the indicates a likelihood the user will like the media asset based at least in part on the interactions with the media asset by a plurality of the friends of the user in the list and the user similarity rating for each of the friends of the user in the list.

2. The computer-implemented method as recited in claim 1, wherein the friends of the user in the list are selected from a social graph that is associated with the user.

3. The computer-implemented method as recited in claim 1, wherein the media asset is a digital music file of a song.

4. The computer-implemented method as recited in claim 3, wherein the interactions with the media asset include at least one of purchasing the digital music file, downloading the digital music file, rendering the song, or discussing the song by the friends of the user.

5. The computer-implemented method as recited in claim 1, wherein the friends of the user in the list are displayed in the asset recommendation interface in the descending order based further on the user similarity rating corresponding to each of the friends of the user.

6. A computer-implemented method, comprising:
compiling interactions with media assets by friends of a user, the friends being identified in a social graph that is associated with the user;
generating friend interaction data for each of the media assets by aggregating the interactions with the media assets by the friends of the user, the friend interaction data including a list of friends of the user that have interacted with the media asset, the list of friend generated by assigning a higher weight to interactions by friends that have a higher user similarity rating the user similarity rating determined from a similarity between the interactions with the media assets by the friends of the user and interaction with the media assets by the user, the friends of the user sorted in a descending order based on an interaction rating corresponding to each friend, the interaction rating determined from the interactions with the media asset by each friend in the list;
generating a prediction rating that indicates a likelihood that the user will like the media asset based at least in part on the interactions with the media asset by a plurality of the friends of the user and the user similarity ratings of the friends of the user;
receiving a selection of a media asset from the user via a user device;
communicating, to the user device, the friend interaction data and the prediction rating that is associated with the media asset selected by the user; and
causing a simultaneous display of the sorted list of friends, the user similarity rating for each friend of the list of friends, and the prediction rating.

7. The computer-implemented method as recited in claim 6, wherein the friend interaction data includes the interactions with the media asset by each friend in the list.

8. The computer-implemented method as recited in claim 6, wherein the user similarity rating indicates which of the friends of the user have similar tastes in media assets to the user.

9. The computer-implemented method as recited in claim 6, wherein the media asset is a digital music file of a song.

10. The computer-implemented method as recited in claim 9, wherein the interactions with the media asset include at least one of purchasing the digital music file, downloading the digital music file, rendering the song, or discussing the song by the friends of the user.

11. A recommendation system, comprising:
a social graph that indicates relationships between a user and friends of the user;
a database of media assets that can be requested by the user and the friends of the user via user devices;
a database of interactions with the media assets by the user and the friends of the user; and
at least a memory and a processor to implement a media asset recommendation service, the media asset recommendation service configured to:
generate friend interaction data for each media asset in the database of media assets, the friend interaction data determined from the social graph, the media assets, and the interactions with the media assets by the user and the friends of the user, the friend interaction data including a list of friends of the user that have interacted with each media asset, and the list of friends of the user sorted in a descending order based on an interaction rating corresponding to each friend, the interaction rating determined from the interactions with the media asset by each friend in the list;
generate a user similarity rating for each of the friends of the user, the user similarity rating indicating a similarity in media asset interactions between the user and each of the friends of the user;
generate a prediction rating that indicates a likelihood that the user will like the media asset based at least in part on the interactions with the media asset by a plurality of the friends of the user and the user similarity ratings of the friends of the user;
communicate, to the user device, the friend interaction data and the prediction rating; and
cause a simultaneous display of the sorted list of friends, the user similarity rating for each friend of the list of friends, and the prediction rating.

12. The recommendation system as recited in claim 11, wherein the media asset recommendation service is further configured to generate the list of friends by assigning a higher weight to interactions by friends that have a higher user similarity rating.

13. The recommendation system as recited m claim 11, wherein the media assets are a digital music files of songs.

14. The recommendation system as recited in claim 11, wherein the interactions with the media assets include at least one of purchasing the digital music files, downloading the digital music files, rendering the songs, or discussing the songs by the friends of the user.

* * * * *